US012151227B2

(12) United States Patent
White, II (10) Patent No.: US 12,151,227 B2
(45) Date of Patent: Nov. 26, 2024

(54) METHOD OF ABSORBING PRECIPITATION (71) Applicant: Locke White, II, Blacksburg, VA (US)

(72) Inventor: Locke White, II, Blacksburg, VA (US)

( * ) Notice: Subject to any disclaimer, the term of this patent is extended or adjusted under 35 U.S.C. 154(b) by 711 days.

(21) Appl. No.: 17/297,891

(22) PCT Filed: Nov. 27, 2019

(86) PCT No.: PCT/US2019/063537
§ 371 (c)(1),
(2) Date: May 27, 2021

(87) PCT Pub. No.: WO2020/112952
PCT Pub. Date: Jun. 4, 2020

(65) Prior Publication Data
US 2022/0032269 A1 Feb. 3, 2022

Related U.S. Application Data (60) Provisional application No. 62/917,216, filed on Nov. 28, 2018, provisional application No. 62/918,310, (Continued)

(51) Int. Cl.
B01J 20/28 (2006.01)
B01J 20/26 (2006.01)
E03F 5/10 (2006.01)

(52) U.S. Cl.
CPC ......... *B01J 20/2805* (2013.01); *B01J 20/267* (2013.01); *E03F 5/101* (2013.01); *B01J 2220/68* (2013.01)

(58) Field of Classification Search
None
See application file for complete search history.

(56) References Cited

U.S. PATENT DOCUMENTS 3,562,153 A 2/1971 Tully et al.
5,456,733 A 10/1995 Hamilton, Jr.
(Continued)

FOREIGN PATENT DOCUMENTS

GB 2382016 5/2003
GB 2485443 A 5/2012
WO WO 02/074217 A1 9/2002

OTHER PUBLICATIONS

AR 97608 A English Language Abstract entitled: "Conditioning blanket and water gelling absorbent for protecting goods in containers from rain, includes micro-perforated layer of polyethylene and permeable non-woven fabric loaded with super-absorbent polymer". (Year: 2016).*

(Continued)

*Primary Examiner* — Joseph D Anthony (57) ABSTRACT

A method of absorbing falling precipitation to prevent the falling precipitation from reaching an area for an activity includes spreading a sufficient amount of a water absorbent including superabsorbent granules over the area prior to or during the falling precipitation so that the superabsorbent granules can absorb the water before the falling precipitation can reach the area wherein the activity can immediately occur after the falling precipitation stops and the water absorbent is removed. Another method of absorbing falling precipitation to prevent the falling precipitation from reaching an area for an activity includes placing an application bag over the area prior to or during the falling precipitation, wherein the application bag includes a sufficient amount of superabsorbent granules inside a casing, wherein the superabsorbent granules can absorb the falling precipitation before the falling precipitation can reach the area, and wherein the activity can immediately occur after the falling precipitation stops and the application bag is removed.

20 Claims, 3 Drawing Sheets

Related U.S. Application Data filed on Jan. 25, 2019, provisional application No. 62/918,526, filed on Feb. 4, 2019, provisional application No. 62/920,028, filed on Apr. 11, 2019, provisional application No. 62/920,740, filed on May 14, 2019.

(56) References Cited

U.S. PATENT DOCUMENTS

| | | | |
|---|---|---|---|
| 6,291,636 | B1 | 9/2001 | Miyake et al. |
| 6,323,645 | B1 | 11/2001 | Morooka et al. |
| 6,606,823 | B1* | 8/2003 | McDonough .......... A01G 9/033 52/173.3 |
| 6,869,464 | B2 | 3/2005 | Klenic |
| 6,905,289 | B1 | 6/2005 | Sanguinetti |
| 7,021,869 | B2 | 4/2006 | Sanguinetti |
| 7,029,205 | B2 | 4/2006 | Daigle |
| 8,100,609 | B2 | 1/2012 | Wilson |
| 8,511,464 | B1 | 8/2013 | Savla |
| 8,720,677 | B2* | 5/2014 | Savla .................... C08F 220/06 206/204 |
| 2002/0039629 | A1 | 4/2002 | Inagaki et al. |
| 2002/0168907 | A1 | 11/2002 | Markusch et al. |
| 2003/0035689 | A1 | 2/2003 | Metz |
| 2003/0140518 | A1 | 7/2003 | Rose |
| 2003/0196606 | A1 | 10/2003 | Mochizuki |
| 2008/0199256 | A1* | 8/2008 | McPhillips .............. C09K 3/32 405/129.57 |
| 2012/0071609 | A1* | 3/2012 | Savla .................... C08F 220/06 525/329.7 |
| 2013/0005919 | A1 | 1/2013 | Kanzaki et al. |
| 2013/0102461 | A1 | 4/2013 | Akiyama et al. |
| 2013/0205716 | A1* | 8/2013 | Savla ........................ E03B 3/03 53/400 |
| 2013/0340388 | A1* | 12/2013 | Savla ..................... B65D 88/78 53/400 |
| 2014/0315034 | A1 | 10/2014 | Akiyama et al. |
| 2016/0251106 | A1 | 9/2016 | Kuziw |
| 2017/0281423 | A1* | 10/2017 | Panayotova ............ A61L 15/58 |

OTHER PUBLICATIONS

International Search Report for PCT/US2019/063537 mailed on Jan. 17, 2020.
Written Opinion of the International Searching Authority for PCT/US2019/063537 mailed on Jan. 17, 2020.
Moist SAP™ Sandless Sandbags—Water Absorbent Polymer Bag for Flood Control, available from amazon.com at "https://www.amazon.com/Moist-SAPTM-Sandless-Sandbags-Absorbent/dp/B09QRWM3M7" available since Jan. 20, 2022 according to site.
Garrison Flood Control Water Activated Gel Filled Flood Bags, available at "https://www.garrisonflood.com/gel-filled-flood-control-bags", date unknown.
New Pig's Pig® Water-Activated Flood Bag, available at "https://www.newpig.com/pig-water-activated-flood-bag/p/WTR009", date unknown.
Durasack Sand Bags from Home Depot, available at "https://www.homedepot.com/p/DURASACK-15-in-x-27-in-White-Woven-Sand-Bags-with-Tie-String-25-Pack-SB-1527CTN/301980932", date unknown.

* cited by examiner

METHOD OF ABSORBING PRECIPITATION

CROSS REFERENCE TO RELATED APPLICATIONS

This application is the National Phase of PCT International Application No. PCT/US2019/063537, filed on Nov. 27, 2019, which claims priority under 35 U.S.C. 119(e) to U.S. Provisional Application No. 62/917,216, filed on Nov. 28, 2018; 62/918,310, filed on Jan. 25, 2019; 62/918,526, filed on Feb. 4, 2019; 62/920,028, filed on Apr. 11, 2019; and 62/920,740, filed on May 14, 2019, all of which are hereby expressly incorporated by reference into the present application.

BACKGROUND OF THE INVENTION

1. Field of the Invention

The present invention relates to a method of absorbing precipitation. In particular, the method comprises using superabsorbent granules to absorb rainwater as soon as the rainwater reaches the ground and before the ground (e.g., dirt) turns into mud.

2. Description of the Background Art

General contractors working on commercial and industrial projects, home builders, and landscapers are often impacted by weather-related delays on construction. General contractors working on a twelve-month long project will inevitably encounter delays due to bad weather, which could potentially cost them a considerable amount of money. Weather, particularly rain, is one of the most frequent types of delays that force contractors to extend their schedule to complete contracted work. These delays can cause many additional costs, including the costs of maintaining an idle workforce and equipment, unabsorbed office overhead, and lost efficiencies, among others. Obviously, one of the biggest weather disrupters is rain. Recovering from one hour of rain can easily take days. Depending on the stage of the work, rain can have varying effects, but the biggest problems happen during the early stages, and more specifically, with the excavation of the site. Temporary roads and exposed dirt can quickly become mud from just a few inches of rain, and a complete quagmire with a downpour that continues for days. Rainwater can make roads impassable, and the equipment can easily become bogged down in the muck or dangerously skid, which puts workers at risk. In addition, rain and other precipitation creates issues with foundation trenches and other areas where concrete is going to be poured because concrete cannot be poured on top of mud and puddles of water. Depending on the stage of the job, rain and other precipitation can have varying effects, but the biggest problems happen during the early stages when the ground has been excavated. Trenches for home foundations, flattened areas for brick patios, and any exposed dirt can quickly become mud from just a few inches of rain. Although some things that can be done to help mitigate the rain problem, such as water pumps to move the standing water, an earth berm around excavations, and plastic sheeting to cover recently completed work, the problem with all of these attempts to keep the rain from delaying the work is that they do not work very well. The plastic sheeting usually gets blown off. Water pumps can remove the puddles of water, but once the exposed dirt gets wet, the dirt quickly turns to mud with nothing that can be done except to wait for the mud to dry. Thus, there is a huge need to ensure that general contractors get their work areas clear and safe for work as quickly as possible after a storm ends. The key to the problem is to prevent the rainwater from reaching the dirt, and if it could be done, it would revolutionize the building and landscaping industry.

SUMMARY OF THE INVENTION

One embodiment of the present invention is directed to a method of absorbing falling precipitation to prevent the falling precipitation from reaching an area for an activity, comprising spreading a sufficient amount of a water absorbent comprising superabsorbent granules over the area prior to or during the falling precipitation (but preferably not after the falling precipitation stops) so that the superabsorbent granules can absorb the falling precipitation before the falling precipitation can reach the area, wherein the activity can immediately occur after the falling precipitation stops and the water absorbent is removed.

In this embodiment, the water absorbent may be spread over the area in an amount to create a layer of water absorbent of about 3-5 mm. The falling precipitation may be at least one of rain, snow, sleet, or hail. The activity may be a construction, landscaping, or sports activity or any activity that needs the area protected from falling precipitation. The superabsorbent granules may comprise potassium polyacrylate. The water absorbent may further comprise a tackifier, water, or a combination thereof. The water absorbent may further comprise sand. The water absorbent may further comprise a coloring. The water absorbent may further comprise an aggregate that is about the same size and density as the superabsorbent granules. The spreading step may be performed by an applicator with a hopper containing the water absorbent wherein the applicator sprays the water absorbent from a hose. This method may further comprise removing the superabsorbent granules from the area and drying the superabsorbent granules for reuse.

Another embodiment of the present invention is directed to a method of absorbing falling precipitation to prevent the falling precipitation from reaching an area for an activity, comprising placing at least one application bag over the area prior to or during the falling precipitation but not after the falling precipitation stops, wherein the application bag comprises a sufficient amount of superabsorbent granules inside a casing, wherein the superabsorbent granules can absorb the falling precipitation before the falling precipitation can reach the area, and wherein the activity can immediately occur after the falling precipitation stops and the application bag is removed.

In this embodiment, the falling precipitation may be at least one of rain, snow, sleet, or hail. The activity may be a construction, landscaping site, or sports activity or any activity that needs the area protected from falling precipitation. The superabsorbent granules may comprise sodium polyacrylate. The casing may comprise an upper casing and a lower casing, wherein the upper casing and the lower casing may be made of a water permeable fabric material. In the alternative, the casing may comprise an upper casing and a lower casing, wherein the upper casing is made of a water permeable fabric material and the lower casing is made of a waterproof material. The casing may comprise dividers to form channels inside the application bag so that superabsorbent granules stay evenly distributed over lower casing. The method may further comprise drying the superabsorbent granules inside of the casing by blowing air through a reclosable opening in the casing so that the superabsorbent granules can be dried and reused. In the alternative, the method may further comprise removing the superabsorbent granules from the casing through a reclosable opening in the casing and drying the superabsorbent granules for reuse.

In the embodiment wherein the casing comprises an upper casing and a lower casing, the upper casing is made of a water permeable fabric material, and the lower casing is made of a waterproof material, the application bag may be placed on recently poured concrete wherein the lower casing is in contact with the recently poured concrete.

Yet another embodiment of the present invention is directed to an application bag comprising superabsorbent granules inside a casing. The casing comprises an upper casing and a lower casing. The upper casing is made of a water permeable fabric material, and the lower casing is preferably/optionally made of a waterproof material.

In the embodiment, the superabsorbent granules may comprise sodium polyacrylate. The casing may comprise dividers to form channels inside the application bag. The application bag may further comprise a reclosable opening in the casing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to one of ordinary skill in the art from this detailed description.

BRIEF DESCRIPTION OF THE DRAWINGS

The present invention will become more fully understood from the detailed description given below and the accompanying drawings that are given by way of illustration only and are thus not limitative of the present invention.

DETAILED DESCRIPTION OF THE INVENTION

The present invention will now be described with reference to the accompanying drawings.

The present invention is directed to a method of absorbing falling precipitation. This method can be accomplished in at least two main ways. First, the method may use loose superabsorbent granules that are spread over an area that is desired to be kept dry so that an activity can occur. Second, the method may use an application bag comprising a casing with superabsorbent granules inside wherein the application bag may be laid over an area that is desired to be kept dry so that an activity can occur.

(1) Loose Superabsorbent Granules

Figure 1A:
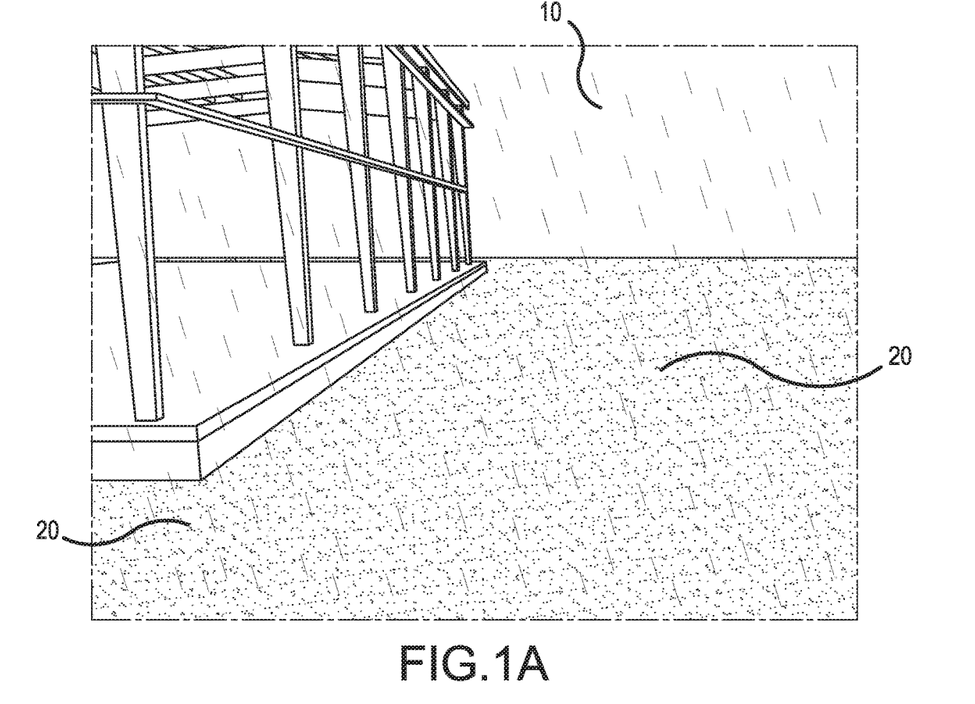
FIG. 1A illustrates one embodiment of the water absorbent of the present invention using superabsorbent granules on the dirt of a construction site.
Figure 1B:
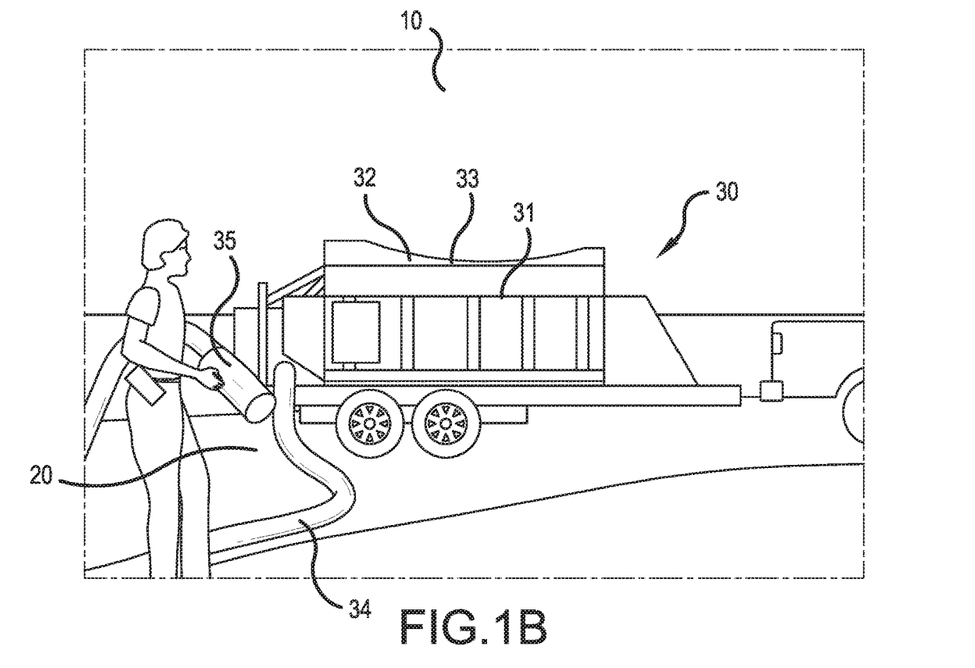
FIG. 1B illustrates the equipment used in the method of the present invention to apply, remove, and recycle the rainwater absorbent.

FIGS. 1A and 1B show an example of one embodiment of a water absorbent 10 of the present invention. The water absorbent 10 combines a reaction with innovative equipment to stop the disruptive effects of rain or other falling precipitation before it hits the ground and reaches exposed dirt. As such, the water absorbent 10 prevents the formation of mud, which, in turn, prevents construction delays. Due to the water absorbent 10, the dirt remains dry even after a large amount of rain. The water absorbent 10 can also be used to keep exposed dug holes for footers of a building under construction from becoming wet.

The water absorbent 10 is ideally used prior to the falling precipitation in order to prevent the puddles from initially forming at all. However, the water absorbent 10 could also be applied during the falling precipitation.

The first component of the water absorbent 10 is superabsorbent granules 20. The superabsorbent granules 20 are generally defined as a polymer that can absorb at least 200 times (preferably at least 300 times, more preferably at least 400 times, and most preferably at least 500 times) its weight in water. In one embodiment, the superabsorbent granules 20, which are classified as hydrogels when cross-linked, absorb aqueous solutions through hydrogen bonding with water molecules. Preferably, the superabsorbent granules are superabsorbent polymers (SAP) such as potassium polyacrylate and/or sodium polyacrylate. Potassium polyacrylate and sodium polyacrylate are readily available. For example, potassium polyacrylate and sodium polyacrylate can be purchased from Shandong Welldone Environmental New Materials Co., Ltd. (No. 230 Changjiang Road, Qingdao City, Shandong Province, China; Brand name: WD; Model No.: SAPA001 or WD-SAP4; see http://en.wchemv.com/sproduct/info/shopuid/14136/pid/82699) or EL Chemical (666 South Tianmen Street, Hi-Tech Industry, CA Development Zone, Taian City, Shandong, China).

Although potassium polyacrylate and sodium polyacrylate are preferred as SAP, other SAP include polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile, and combinations thereof.

The size of the SAP is not generally limited. However, the SAP are typically about the size of rice (i.e., 5.0 to 7.5 mm in length). In order to make handling easier, the superabsorbent granules are preferably about 6.35 mm to 7.5 mm or longer. Other embodiments include superabsorbent granules with a length of about 3-5 mm. The size is preferably about 3-5 mm.

The SAP can absorb at least 200-300 times its weight of water, which means that even after several days of rain, construction can continue. In fact, a ¼ inch layer of the superabsorbent granules 20 can absorb six inches of water. A superabsorbent polymer is generally defined as any polymer that can absorb and retain extremely large amounts of a liquid relative to its own mass (e.g., at least 200-300 times its weight of water). Examples of SAP are described above.

More specifically, SAP are polymers that can absorb and retain extremely large amounts of liquid. They are solid, granular, or powder cross linked polymers that rapidly absorb and retain large volumes of aqueous solutions. They absorb aqueous solutions through hydrogen bonding with water molecules. The SAP's ability to absorb water is dramatically dependent on the ionic concentration in aqueous solution. SAP may absorb the amount of distilled water 500 times greater than its weight, expanding by nearly 40 times its own volume. The presence of ions in the solution creates osmotic pressure that competes with an osmotic pressure within the polymer, thus reducing the water capacity to bind with polymer. SAP is nontoxic, can absorb a lot of water quickly and repeatedly, and has good water retention.

The superabsorbent granules 20 preferably include potassium polyacrylate and/or sodium polyacrylate. The potassium polyacrylate includes high cross-link density polymers that exhibit lower absorbent capacity and swell, but the gel strength is firmer and can maintain particle shape even under modest pressure. This embodiment of superabsorbent granules is not very sticky when wet compared to wet sodium polyacrylate, so workers using construction equipment are able to pick the superabsorbent granules 20 off the ground without the superabsorbent granules 20 sticking to the equipment. This embodiment of superabsorbent granules is very safe for workers and very environmentally friendly. Superabsorbent granules 20 of potassium polyacrylate, unlike sodium polyacrylate that is used in diapers and can also absorb an enormous amount of water, does not become a sticky gel when wet. Superabsorbent granules 20 of potassium polyacrylate swell with the added rainwater but remain fairly loose particles that are not stuck together in an unmanageable mess. Therefore, superabsorbent granules 20 of potassium polyacrylate can be picked up and moved without sticking to equipment or objects or people, which is a critical attribute.

If there is a hillside on the construction site or wind might be an issue, a light liquid tackifier, commonly used in hydroseeding, can be added to the water absorbent 10 in order to keep the superabsorbent granules 20 in place. Examples of tackifiers include guar, plantago, and polyacrylamide. In another embodiment, a small amount of water can be added to the superabsorbent granules 20 prior to application, or a fine mist of water can be sprayed on the superabsorbent granules 20 while being applied onto the ground or after the superabsorbent granules 20 are already on the ground. All of these options slightly add weight to the superabsorbent granules 20 to keep the superabsorbent granules 20 in place. All methods will keep the superabsorbent granules 20 stuck in place or slightly weighted down until the rain hits and is absorbed and further weighs the superabsorbent granules down. The content of the tackifier in the water absorbent 10 is not particularly limited. However, if included, the content of the tackifier in the water absorbent 10 may be in the range of from 0.01 to 10% by weight, preferably 0.05 to 5% by weight, based on the dry weight of the water absorbent 10.

In another embodiment, sand can be mixed in with the superabsorbent granules 20. As such, when the superabsorbent granules 20 get wet, the sand creates traction, which prevents workers from slipping when walking on the water absorbent 10. The content of the sand in the water absorbent 10 is not particularly limited. However, if included, the content of the sand in the water absorbent 10 may be in the range of from 0.01 to 10% by weight, preferably 0.05 to 5% by weight, based on the dry weight of the water absorbent 10.

In yet another embodiment, a coloring can be added to the superabsorbent granules 20 so that workers can distinguish the areas where the water absorbent 10 has been applied and areas that are dirt and grass (i.e., areas where the water absorbent has not been applied). The coloring is preferably environmentally friendly. The coloring is also preferably a bright color (e.g., red). The coloring allows workers to more easily and quickly recognize where the water absorbent 10 needs to be applied prior to rainfall and where the water absorbent 10 needs to be removed after rainfall. The content of the coloring in the water absorbent 10 is not particularly limited. However, if included, the content of the coloring in the water absorbent 10 may be in the range of from 0.01 to 10% by weight, preferably 0.05 to 5% by weight, based on the dry weight of the water absorbent 10.

In a further embodiment, a small aggregate that is the same size and density/weight of the superabsorbent granules 20 can be mixed into the water absorbent 10 to increase the coverage area and greatly reduce the cost since the aggregate is much cheaper than superabsorbent granules. The amounts of the aggregate and superabsorbent granules are not generally limited. However, the mix is preferably about 67% aggregate and 33% superabsorbent granules on a volume basis. This embodiment of the water absorbent 10 has improved performance because the water hits the aggregate and runs off the side where the water comes into contact with the superabsorbent granules 20. Thus, the water is absorbed rather than hitting bare ground. The aggregate in this embodiment also keeps the superabsorbent granules 20 in place when first applied and dried and prevents the wind from blowing the water absorbent 10 off the area. Finally, in this embodiment, the aggregate keeps the superabsorbent granules 20 from sticking together when wet, which allows for easier removal of the water absorbent 10 from the ground.

Another feature of the superabsorbent granules 20 of potassium polyacrylate is that these superabsorbent granules 20 are easy to squeeze the water out, which means the superabsorbent granules 20 can be used repeatedly. Accordingly, other than saving costs to general contractors by preventing weather-related construction delays, the water absorbent 10 reduces costs by being reusable. Specifically, the superabsorbent granules 20 can be dried out and continuously reused, so general contractors would need to purchase the water absorbent 10 less often. The superabsorbent granules 20 using potassium polyacrylate are able to be washed off and/or left to soak in water to wash off any dirt so that the absorbency is not diminished with each use. When placed in water to soak, the superabsorbent granules 20 will rise to the top of the water, and the dirt, rocks, etc. will sink to the bottom. At this point, the superabsorbent granules 20 are able to be easily skimmed off the top for drying and reuse.

The water absorbent 10 can be applied, removed, and recycled with applicator/vac/recycling equipment 30. The applicator/vac/recycling equipment 30 can be used to quickly spray on and apply dry superabsorbent granules 20 to cover an entire area for an activity wherein the activity can immediately occur after the falling precipitation stops and the water absorbent 10 is removed. In addition, the applicator/vac/recycling equipment 30 can be used to easily and quickly vacuum the wet superabsorbent granules 20. Then, the applicator/vac/recycling equipment 30 can squeeze the water out of the superabsorbent granules 20 for future use.

One embodiment of the applicator/vac/recycling equipment 30 is a pulled-behind tank blower 31 similar to those used now to blow mulch or straw that has a hopper 32. The hopper 32 is a large enclosed compartment for holding the dry superabsorbent granules 20. The applicator/vac/recycling equipment 30 has door 33 on top, a hose 34, and a nozzle 35. The applicator/vac/recycling equipment 30 is able to use air to blow the superabsorbent granules 20 out over any exposed dirt and/or any exposed concrete floors and/or holes for footers of a building under construction. Once the rain or other precipitation has fallen and then has passed, the applicator/vac/recycling equipment 30 can be reconfigured into a powerful vacuum that can easily suck wet superabsorbent granules 20 back up into hopper 32 using the hose 34 and a vac hood attachment. Once the wet superabsorbent granules 20 are inside the hopper 32, a compaction of wet superabsorbent granules 20 removes the water and leaves the dry superabsorbent granules 20, which can be reapplied. Since the superabsorbent granules 20 can be reused, general contractors can save money. The water can be removed from the superabsorbent granules 20 by moving an interior wall inside of the hopper 32 towards a non-moving interior wall on the far side of the hopper 32. As such, the superabsorbent granules 20 are compressed and squeezed, which causes the water to drop down through holes in the bottom of the hopper 32 and leaves dry superabsorbent granules 20.

In another embodiment, the applicator/vac/recycling equipment has no vacuuming capabilities and therefore is referred to as an applicator/recycling equipment. The applicator/recycling equipment is used to quickly apply the dry superabsorbent granules 20 as well as to easily and quickly remove the water from the wet superabsorbent granules 20 for future use. The applicator/recycling equipment can simply be a pulled-behind tank blower similar to those used with mulch that has a hopper for holding the dry superabsorbent granules 20. In addition, the applicator/recycling equipment has a lid, a door in the top that can be opened and closed, with small holes and fine screens covering them. The applicator/recycling equipment has a hose and a nozzle and is able to blow superabsorbent granules 20 out over any exposed dirt using air. Once the rain or other precipitation has passed, a tractor with a front end loader or any other equipment that has a scoop can scrape and pick up wet superabsorbent granules 20 and dump the superabsorbent granules 20 back into the hopper of the applicator/recycling equipment. Then, the lid of the hopper can be closed. In addition, a tractor with a spinning street brush can first sweep superabsorbent granules 20 into a pile before being scooped up. The air of the applicator/recycling equipment can then be rerouted to blow up through the bottom of the hopper and out holes of the lid in the top of the hopper to remove water from the wet superabsorbent granules 20 to leave dry superabsorbent granules 20 that can be reapplied in order to save money.

A heater can be added to this embodiment of the applicator/recycling equipment to blow hot air and speed up the drying process. In this embodiment, additional turning metal components inside of the hopper can be used to stir superabsorbent granules 20 around (like inside a concrete mixer), speeding the drying process and breaking up any superabsorbent granules 20 that are stuck together in large clumps. Also with this embodiment, air can be blown into the top of the hopper, and with small holes in the bottom of the hopper, the blown air forces water out of the superabsorbent granules 20 to dry the superabsorbent granules 20.

In further embodiments, the hopper may use blowing air and/or heaters going through pipes/vents that are spread out on a large area of ground to dry the superabsorbent granules 20. With this embodiment, a grid of pipes with small holes could be laid out on the ground, the superabsorbent granules 20 can be spread among the grid of pipes, and then air can be blown through the pipes to dry the water out of the superabsorbent granules 20.

In another embodiment, dry superabsorbent granules 20 may be spread over a construction site using applicator equipment that only spreads the superabsorbent granules 20 over the construction site dirt and does not have the capability of vacuuming or recycling as the other embodiments described above. In this embodiment, the applicator equipment may be the same as salt and sand broadcast spreaders commonly used on skid loaders and tractors. Another embodiment of the applicator equipment has a trough that is attached to the front of a skid loader or tractor, and the superabsorbent granules 20 are simply gravity dropped over the construction site dirt, exactly like consumer fertilizers that drop fertilizer over a homeowner's yard. In a further embodiment, superabsorbent granules 20 are distributed over an area by the building/landscaping contractor by using a small broadcast spreader commonly used by homeowners to apply fertilizer on their lawn.

In another embodiment, recycling equipment, which is not capable of spreading the superabsorbent granules 20 and is comprised of two pieces of equipment that only collect and then dry wet superabsorbent granules 20. The first piece of equipment is a sweeper attachment (e.g., a Bobcat Sweeper Attachment) that may be attached to a skid loader and has a large spinning brush like those on street sweepers, and a collection bin behind that the brush sweeps debris into and can be emptied. A recycling container, the second piece of equipment in this embodiment, may be used for drying superabsorbent granules 20. The recycling container may be a retrofitted 20' (or larger) shipping container commonly used to ship goods from China on a ship. The recycling container may have double doors on one long side and may have a hinged top that can be opened and closed. Laid on the floor of recycling container may be a grid of galvanized pipes with holes and all may be interconnected. A propane turbine heater may be connected to the end of the galvanized pipes and may blow hot air through the pipes, out the holes, and up through the wet superabsorbent granules 20 in order to dry them so that they may be reused. In further embodiments, the recycling container may be any enclosed compartment/equipment that is known to those skilled in the art to dry out material using heated air like, but not limited to, grain dryers, or anything else. Additional parts can be added inside to continuously turn wet granules over as heated air is blown on the superabsorbent granules 20 in order to dry them faster.

In any of the embodiments described above, a road roller compactor can be utilized to first squeeze water out of the wet superabsorbent granules 20 before being placed into a recycling container for drying. A road roller compactor can be run over the wet superabsorbent granules in order to squeeze out about 75% of the water before being dumped into a recycling container and dried. For example, a strip of land (e.g., of about 10'×50') near a recycling container may have drainage pipes with holes laid down that can withstand the weight of the road roller compactor. Then, large and small aggregate may be placed on top of the drainage pipes. Finally, a heavy-duty fine mesh tarp may be placed on top of the aggregate. The wet superabsorbent granules 20 may be collected, and instead of putting them directly in a recycling container, the superabsorbent granules 20 may be put in small piles out over the mesh tarp. Then, the superabsorbent granules 20 may be covered with a second mesh tarp to keep the superabsorbent granules 20 in place. Next, the road roller compactor may run over the superabsorbent granules 20 one or more times (preferably two times) to force the water out and down into the drainage pipes. The superabsorbent granules 20 may then be picked up again, dumped into the recycling container, and dried. In this embodiment, any heavy equipment and/or vehicle with tires can be run over the wet granules in order to squeeze out the water before being place into the recycling container. In another embodiment, instead of using a road roller compactor or heavy equipment to run over the wet granules, a dumpster trash compactor that is now used to compressed garbage may be utilized to squeeze water out of the wet granules before being placed into the recycling container.

In another embodiment, wet superabsorbent granules 20 may be spread in a layer over the ground, and large commercial warehouse fans may be used to blow air over the superabsorbent granules 20 to dry them. The sun may also speed the drying process.

In a further embodiment, a large commercial blower attached to a tractor or a small handheld leaf blower can be used to blow wet superabsorbent granules 20 off a work area and into a pile. Then, the superabsorbent granules 20 may be collected by scooping them up with a tractor or by simply using a handheld shovel. A small wet/dry vacuum can also be utilized to suck wet superabsorbent granules 20 out of holes and trenches.

In the embodiment shown in FIGS. 1A to 1B, the water absorbent 10 is very quick, easy, and cost effective to use for preventing the work-stopping mud at a construction site. Before the rain comes, a worker may spray out a layer of about 3-5 mm (preferably about 4 mm) of superabsorbent granules 20 on the entire site, or just on the critical areas like roads and/or work locations like exposed holes and trenches for footers, and any other exposed dirt on a construction or landscaping site with the applicator/vac/recycling equipment 30. The dry superabsorbent granules 20 are blown out of the hopper 32, down the hose 34, out of the nozzle 35, and onto the exposed dirt and/or exposed critical building areas. When the rainwater or other precipitation falls, it is immediately absorbed by the superabsorbent granules 20 and never reaches the dirt and/or critical areas of building under construction. After the rain or other precipitation stops, the worker can immediately reconfigure the applicator/vac/recycling equipment 30 to suck up the superabsorbent granules 20 through a vac hood attachment, then through the hose 34, and then blown into the hopper 32. Then, using the moving interior wall of the hopper 32, the compaction motion can squeeze the water out of the superabsorbent granules 20 until the superabsorbent granules 20 are dry and ready for the next use. Due to the water absorbent 10, the dirt on the construction site remains dry, and the work can proceed like the rain never happened.

In another embodiment, before the rain or other precipitation comes, a worker sprays out a layer of about 3-5 mm (preferably about 4 mm) of superabsorbent granules 20 on the entire site or just on the critical areas with the applicator/recycling equipment. When the rain or other precipitation falls, it is immediately absorbed and never reaches the dirt and/or critical areas of building under construction. After the rain or other precipitation stops, the worker can use a tractor with a front end loader to immediately scrape and scoop up the wet superabsorbent granules 20, place them back in the hopper of the applicator/recycling equipment. Then, air may be either blown in the bottom or in the top, and the superabsorbent granules 20 can be dried so that they are ready for the next use. To speed the drying process, a heater can add heat to the blowing air. Due to the water absorbent, the dirt on the construction site remains dry, and the work can proceed like the rain never happened.

In another embodiment, dry superabsorbent granules 20 may be spread out by hand, being thrown in all directions to cover construction site dirt and other critical areas. In the alternative, a handheld or pushed grass seed/fertilizer distributor may be used to spread dry superabsorbent granules 20 to cover the dirt and/or other critical areas. Once the rain or other precipitation has passed, a rake or hoe or some other handheld yard tool may be used to move wet superabsorbent granules 20 off the dirt/critical areas and moved to an area where the sun and/or blowing fans and/or heaters may be utilized to dry the superabsorbent granules 20.

In another embodiment, the wet superabsorbent granules 20 may be swept up with a tractor that has a large revolving brush used to clean streets that also has a hopper behind the brush. Instead of pushing forward, the wet superabsorbent granules 20 are swept backwards in the hopper.

In another embodiment, superabsorbent granules 20 may be spread out on a sport field right before a rain storm or other falling precipitation and absorb the falling precipitation as soon as it hits the ground, keeping the field completely dry so that there is no delay in playing the game. The sport field could include baseball infields and outfields, football fields, soccer fields, and any other outdoor sports venue.

In this regard, the above embodiments are mostly directed to constructions sites. However, any outdoor area wherein one would prefer the ground to not get wet could benefit from the present invention. As noted above, this area could include sport fields. However, the present invention could also be used for outdoor wedding or other social events as well as for landscaping job sites.

Similarly, the above embodiments are mostly directed to absorbing rainwater. However, the present invention would equally prevent any source of falling precipitation from reaching the ground. For example, other types of falling precipitation may include at least one of snow, sleet, or hail.

(2) Application Bag Comprising Superabsorbent Granules in a Casing

Figure 2:
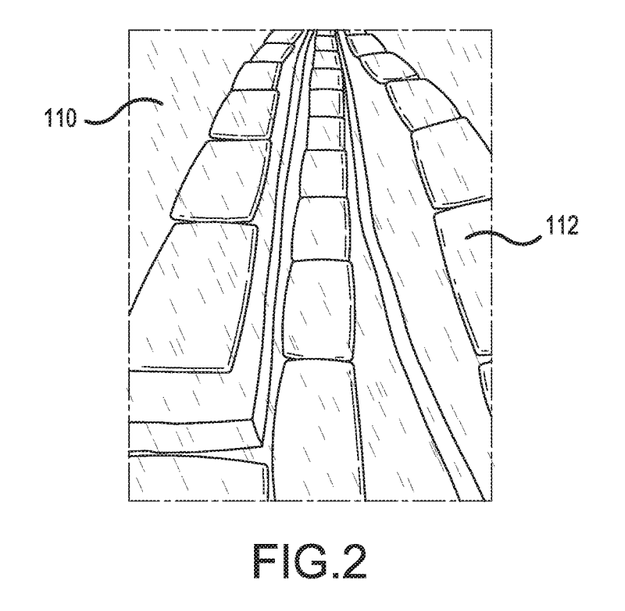
FIG. 2 illustrates another embodiment of the water absorbent of the present invention using an application bag on the dirt of a construction site.

FIG. 2 shows an example of one embodiment of a water absorbing system 110 of the present invention. The water absorbing system 110 stops the disruptive effects of rain or other source of falling precipitation as soon as it hits the ground. As such, the water absorbing system 110 prevents the formation of mud, which, in turn, prevents construction and landscaping work delays. Due to the water absorbing system 110, the dirt remains dry even after a large amount of rain. The water absorbing system 110 can also be used to keep dug holes and trenches for foundation footers of a building under construction, excavated areas for landscaping pavers and/or concrete slabs, and any other exposed dirt on a construction or landscaping site from becoming wet.

The first component of the water absorbing system 110 is superabsorbent granules 20. The superabsorbent granules 20 are generally defined as a polymer that can absorb at least 200 times (preferably at least 300 times, more preferably at least 400 times, and most preferably at least 500 times) its weight in water. In one embodiment, the superabsorbent granules 20, which are classified as hydrogels when crosslinked, absorb aqueous solutions through hydrogen bonding with water molecules. Preferably, the superabsorbent granules are superabsorbent polymers (SAP) such as potassium polyacrylate and/or sodium polyacrylate. Potassium polyacrylate and sodium polyacrylate are readily available. For example, potassium polyacrylate and sodium polyacrylate can be purchased from Shandong Welldone Environmental New Materials Co., Ltd. (No. 230 Changjiang Road, Qingdao City, Shandong Province, China; Brand name: WD; Model No.: SAPA001 or WD-SAP4; see http://en.wchemv.com/sproduct/info/shopuid/14136/pid/82699) or EL Chemical (666 South Tianmen Street, Hi-Tech Industry, CA Development Zone, Taian City, Shandong, China).

Although potassium polyacrylate and sodium polyacrylate are preferred as SAP, other SAP include polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile, and combinations thereof.

The size of the SAP for the water absorbing system 110 is not generally limited. However, the SAP may be about 3-5 mm but could be as small as 1-3 mm, 1-2 mm, or even less than 1 mm.

The SAP can absorb at least 200-300 times its weight of water, which means that even after several days of rain, construction can continue. A superabsorbent polymer is generally defined as any polymer that can absorb and retain extremely large amounts of a liquid relative to its own mass (e.g., at least 200-300 times its weight of water). Examples of SAP are described above.

More specifically, SAP are polymers that can absorb and retain extremely large amounts of liquid. They are solid, granular, or powder cross linked polymers that rapidly absorb and retain large volumes of aqueous solutions. They absorb aqueous solutions through hydrogen bonding with water molecules. The SAP's ability to absorb water is dramatically dependent on the ionic concentration in aqueous solution. SAP may absorb the amount of distilled water 500 times greater than its weight, expanding by nearly 40 times its own volume. The presence of ions in the solution creates osmotic pressure that competes with an osmotic pressure within the polymer, thus reducing the water capacity to bind with polymer. SAP is nontoxic, can absorb a lot of water quickly and repeatedly, and has good water retention.

The superabsorbent granules 20 preferably include potassium polyacrylate or sodium polyacrylate. The potassium polyacrylate includes high cross-link density polymers that exhibit lower absorbent capacity and swell, but the gel strength is firmer and can maintain particle shape even under modest pressure. This embodiment of superabsorbent granules consisting of potassium polyacrylate is not very sticky when wet compared to wet sodium polyacrylate, so workers using construction equipment are able to pick the superabsorbent granules 20 off the ground without the superabsorbent granules 20 sticking to the equipment. However, since the superabsorbent granules 20 are inside a casing, whether the superabsorbent granules 20 are sticky is not relevant. Thus, if the superabsorbent granules 20 are inside a case, the superabsorbent granules are preferably sodium polyacrylate since sodium polyacrylate is cheaper than potassium polyacrylate. This embodiment of superabsorbent granules is very safe for workers and very environmentally friendly.

Figure 3:
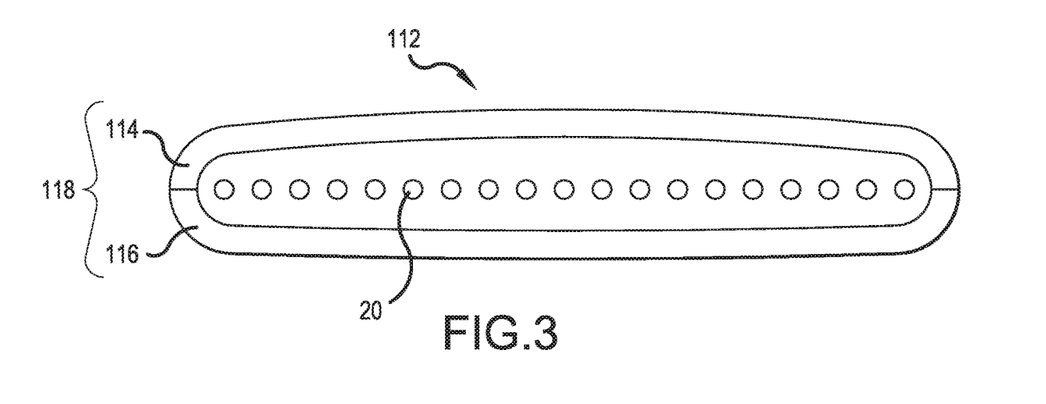
FIG. 3 is a diagrammatic cross-sectional view of one embodiment of the application bag.
Figure 4:
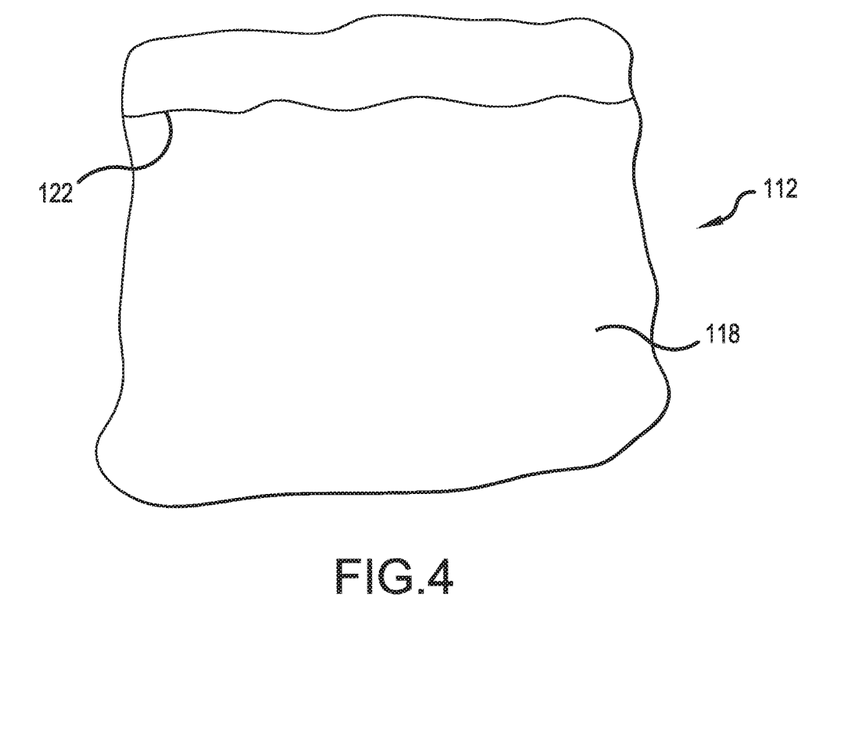
FIG. 4 illustrates one embodiment of the application bag.

In this case, as shown in FIGS. 3 and 4, the superabsorbent granules 20 are enclosed in a casing 118 that comprises an upper casing 114 and a lower casing 116. The combination of the superabsorbent granules 20 in the casing 118 is referred to as a water absorbing application bag 112. The application bag 112 may be laid over the construction or landscaping dirt and/or other critical areas of exposed dirt before it rains or other falling precipitation occurs. The application bag 112 has an additional advantage over the loose superabsorbent granules since the application bag 112 with wet superabsorbent granules 20 is easier to pick up than loose wet superabsorbent granules 20 after the rain or other falling precipitation ends. In other words, the application bag 112 does not need to be vacuumed or shoveled that would be done with loose wet superabsorbent granules 20 in order to be removed from the construction site.

In one embodiment, the superabsorbent granules 20 are enclosed by a casing 118 of a water permeable fabric material. In other words, the upper casing 114 and the lower casing 116 may be made of the same material (e.g., a water permeable fabric material). For example, the water permeable fabric material may be a nonwoven material, such as a drainfield fabric or a geotextile. Preferably, the water permeable fabric material only allows water to get inside but not mud particles or other debris like small stones, twigs, and other similar things commonly found on the ground of a construction or landscaping site. As such, the superabsorbent granules 20 would not be contaminated with mud, small stones, twigs, and other things that would stick to it or be absorbed by it.

In another embodiment, the upper casing 114 and the lower casing 116 may be made of different materials. In this case, the upper casing 114 may be made of a water permeable fabric material. For example, the water permeable fabric material may be a nonwoven material, such as a drainfield fabric or a water permeable geotextile. Preferably, the water permeable fabric material only allows water to get inside but not mud particles or other debris. Then, the lower casing 116 may be made of a waterproof material. For example, the waterproof material may be a plastic fabric, plastic sheeting, a waterproof geotextile, or some other waterproof flexible material that can be sewn and/or sealed together with the water permeable fabric material of the upper casing 114. As another option, the waterproof material may be the same material as the upper casing 114 but coated with a waterproof coating via a waterproof spray or other conventional means. An advantage of the lower casing 116 being a waterproof material is that, if any falling precipitation does not initially hit any of the superabsorbent granules 20 when it has passed through the upper casing 114, the falling precipitation would not be able to pass through the bottom of the application bag 112 and go into the dirt, but would instead be absorbed by the superabsorbent granules 20 elsewhere inside the casing 118. Thus, all the falling precipitation is captured and held inside the application bag 112, and another advantage is that less superabsorbent granules 20 are needed inside the casing, which reduces the cost of manufacturing the application bag 112.

This particular embodiment wherein the upper casing 114 is made of a water permeable fabric material and the lower casing 116 is made of a waterproof material is also particularly useful to be used on recently poured concrete to protect the concrete from falling precipitation and from freezing. That is, the waterproof material would also help hold in heat and/or keep cold out, and the upper casing 114 would also provide some insulation. In addition, a little water can be sprayed on the application bag 112 to further help insulate the concrete from freezing temperatures while also adding some weight to the application bag 112. Additionally, by having the lower casing 116 made with a waterproof material, the application bag 112 can be placed directly on top of recently poured concrete and will protect it without pulling, or absorbing, any of the water out of the concrete, weakening the strength of the concrete when fully cured.

The application bag 112 is not particularly limited in size and can be as large or as small as needed, depending on the application. For example, the application bag 112 may be at least 2 feet wide to cover the width of a typical size trench that is dug for a house foundation. In this case, the length may be about only 3-4 feet long to prevent the application bag 112 from being too heavy to be picked up by workers after absorbing water from falling precipitation.

The thickness of the material used for the application bag 112 is not particularly limited but is thick enough to withstand substantial weight of wet superabsorbent granules 20, and for the tough conditions of a building site and being thrown around by construction workers. The inner content thickness of the application bag 112 is not particularly limited. However, the application bag 112 may preferably have only one layer of superabsorbent granules 20 so that the inner contents of the application bag 112 may be about 3-5 mm thick. Since the application bag 112 has a waterproof lower casing 116, however, superabsorbent granules 20 do not have to completely cover the entire lower casing 116, and therefore, there may be some areas of the inside of the application bag 112 that may not include a layer of superabsorbent granules 20.

The amount of superabsorbent granules 20 contained in the bag is preferably about six ounces per square foot. However, the amount of superabsorbent granules inside the casing 118 is not particularly limited and could be more or less than this amount. For example, the amount of superabsorbent granules inside the casing 118 may be 1-20 ounces per square foot, preferably 2-10 ounces per square foot, and most preferably about 6 ounces per square foot. Based on this information, one of ordinary skill in the art could approximate the amount of superabsorbent granules 20 needed for different sizes of application bags. In particular, the amount of superabsorbent granules 20 is preferably enough to create an even layer in the casing 118 of about 3-5 mm, but larger or thinner thicknesses could also be used.

The application bag 112 preferably has only one big compartment inside the casing 118. If the lower casing 116 is waterproof, the falling precipitation will be absorbed by the superabsorbent granules 20 even if the superabsorbent granules 20 shift inside the casing and the falling precipitation does not initially hit the superabsorbent granules 20.

Figure 5:
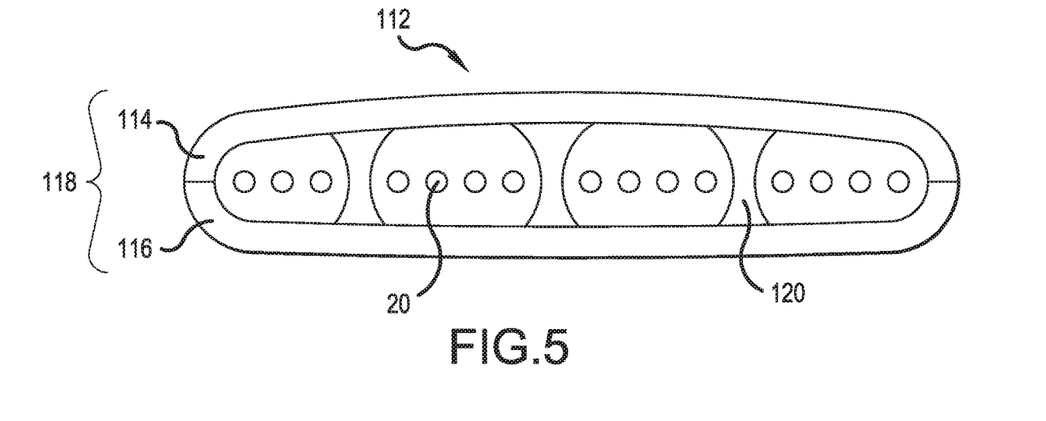
FIG. 5 is a diagrammatic cross-sectional view of another embodiment of the application bag.

However, in another embodiment, the application bag 112 may have dividers 120 to form channels inside the application bag 112 (see FIG. 5). The dividers 120 may be sewn or heat welded to the casing 118. The dividers 120 prevent the superabsorbent granules 20 from collecting on one side of the application bag 112 during transportation from the home improvement store, or while being applied over the exposed dirt. With or without the dividers 120, the application bag 112 could be shaken to spread out the superabsorbent granules 20 prior to placing the application bag 112 on the desired area.

The casing 118 of the application bag 112 may include a reclosable opening 122. The opening 122 may be closed by conventional means such as a hook and loop closure, a ziplock, a sliding seal, a zipper, snaps, or any other means or hardware known to one of ordinary skill in the art. The opening 122 may be on the upper casing 114, the lower casing 116, or between the upper casing 114 and the lower casing 116. The opening 122 is preferably a hook and loop closure. In this case, the hook may be on the upper casing 114, and the loop may be on the lower casing 116. In the alternative, the hook may be on the lower casing 116, and the loop may be on the upper casing 114.

To dry the superabsorbent granules 20, the wet superabsorbent granules 20 may be dried inside the casing 118. That is, the wet superabsorbent granules 20 may not be removed from the casing 118. Then, hot air may be blown inside the casing 118. The hot air may come from a hose inserted into the opening 122 of the casing 118. The air may be heated with a heater such as a turbine heater or a turbine-type kerosene heater. The heater could have a hood-type attachment over the end with multiple hoses attached to it in order to dry multiple application bags 112 at the same time. The casing 118 may keep the hot air contained inside the casing 118, which may speed up the drying process. This drying process saves time by skipping the step of taking the wet superabsorbent granules 20 out of the casing 118, drying them, and then putting the dry superabsorbent granules 20 back in the casing 118.

As yet another option for drying the superabsorbent granules 20 inside the casing 118, the application bag 112 may be placed on a hard surface. Then, a truck or other heavy equipment may be driven over the bag. The weight squeezes out some of the water before hot air is used. By removing some of the excess water first, the drying process may be sped up.

As a further option for drying the superabsorbent granules 20 inside the casing 118 when the upper casing 114 is made of a water permeable fabric material and the lower casing 116 is made of a waterproof material, the application bag 112 may be inverted so that the lower casing 116 of waterproof material is on top and the upper casing 114 of water permeable fabric material is on bottom. A person could then insert a hose into the opening 122 of the casing 118 to blow hot air inside the casing 118. The air may be heated with a heater such as a turbine heater or a turbine-type kerosene heater. The heater could have multiple hoses attached to it in order to dry multiple application bags 112 at the same time. With the lower casing 116 of waterproof material on top, the hot air may be contained inside the casing 118 longer than if a water permeable fabric material is on top, which may further speed up the drying process. In other words, the waterproof material keeps the heat inside the casing 118, and the ground prevents the hot air from going through the water permeable fabric material. This drying process saves time by skipping the step of taking the wet superabsorbent granules 20 out of the casing 118, drying them, and then putting the dry superabsorbent granules 20 back in the casing 118.

In another embodiment of the drying process, rather than using a heater to blow hot air through a hose into the opening 122 of the casing 118, a person could use a fan to blow cool air through a hose into the opening 122 of the casing 118. The fan may have multiple hoses attached to it in order to dry multiple application bags 112 at the same time. Of course, this process would take longer than using hot air, but the wet superabsorbent granules 20 would still dry and be ready for reuse.

As another option, the opening 122 allows the wet superabsorbent granules 20 to be dumped out and dried and then put back into the casing 118. The superabsorbent granules 20 can be dried by the sun or by any of the other means discussed above with respect to the loose superabsorbent granules 20.

In the embodiment shown in FIG. 2, the water absorbing system 110 is very quick, easy, and cost effective to use for preventing the work-stopping mud at a construction site and/or landscaping site. Before the rain or other falling precipitation comes, a worker may spread out as many application bags 112 as needed to cover the entire site, or just on the critical areas like roads and/or work locations and/or holes for footers. When the precipitation falls, it is immediately absorbed by the superabsorbent granules 20 in the application bags 112 and never reaches the dirt and/or critical areas of building under construction. After the rain or other falling precipitation stops, the worker can move the application bags 112 with the wet superabsorbent granules 20 out of the way. The superabsorbent granules 20 inside the casing 118 can then be dried and reused numerous times, which reduces cost. Due to the water absorbing system 110, the dirt on the construction or landscape site remains dry, and the work can proceed like the rain or other falling precipitation never happened.

Another feature of the application bag 112 is that the superabsorbent granules 20 are easy to squeeze the water out, which means the application bag 112 can be used repeatedly. Accordingly, other than saving costs to general contractors by preventing weather-related construction delays, the water absorbing system 110 reduces costs by being reusable. Specifically, the superabsorbent granules 20 can be dried out and continuously reused, so general contractors would need to purchase the water absorbing system 110 less often. The casing 118 with the wet superabsorbent granules 20 inside may also be washed off and/or left to soak in water to wash off any muddy water that has made it inside, helping to rejuvenate superabsorbent granules 20.

In another embodiment, the application bag 112 may be spread out on a sport field right before a rain storm and absorb the water as soon as it hits the ground, keeping the field completely dry so that there is no delay in playing the game. The sport field could include baseball infields and outfields, football fields, soccer fields, and any other outdoor sports venue. In this embodiment, the application bag 112 may be in smaller sizes as described above, or the application bag 112 could be the size of the desired sport field. After the falling precipitation hits the application bag 112, the wet superabsorbent granules 20 can be dried on the field by any of the methods described above (e.g., sun, blown air, etc.).

In this regard, the above embodiments are mostly directed to constructions sites. However, any outdoor area wherein one would prefer the ground to not get wet could benefit from the present invention. As noted above, this area could include sport fields. However, the present invention could also be used for outdoor wedding or other social events as well as for landscaping job sites.

Similarly, the above embodiments are mostly directed to absorbing rainwater. However, the present invention would equally prevent any source of falling precipitation from reaching the ground, such as at least one of snow, sleet, or hail.

The application bag 112 has advantages over the loose superabsorbent granules 20. First, the application bag 112 eliminates the guesswork on the proper amount of superabsorbent granules 20 to spread over an area. The application bag 112 would automatically apply the appropriate amount of dry superabsorbent granules 20. Placing the application bags 112 with the pre-measured and proper amount of superabsorbent granules 20 inside is generally much easier and faster than spreading loose superabsorbent granules 20, prevents too many superabsorbent granules 20 from being used and wasted, and also too little superabsorbent granules 20 from being used for the area, which would allow falling precipitation to soak into the dirt. Second, if a storm passes a construction site without raining, it is generally much easier and faster to pick up the application bags 112 with dry superabsorbent granules 20 inside than vacuuming or shoveling up dry loose superabsorbent granules 20. All dry superabsorbent granules 20 inside application bags 112 are also picked up and none are left behind on the ground being wasted. Third, it is generally much easier and faster to pick up the application bags 112 with wet superabsorbent granules 20 inside than vacuuming or shoveling up wet loose superabsorbent granules 20. All wet superabsorbent granules 20 are picked up and none are left behind on the ground being wasted. Fourth, the casing 118 of the application bag 112 prevents mud and other debris from contaminating the superabsorbent granules 20. In addition, since the superabsorbent granules 20 are inside the casing 118, it is not a problem if the wet superabsorbent granules 20 become sticky.

EXAMPLES

Example 1: Method of Absorbing Rainwater to Prevent the Rainwater from Reaching an Area Using Loose Superabsorbent Granules Before rain begins, a worker sprays out a layer of approximately one continuous layer of superabsorbent granules that is 3-5 mm thick of potassium polyacrylate from Shandong Welldone Environmental New Materials Co., Ltd. (No. 230 Changjiang Road, Qingdao City, Shandong Province, China; Brand name: WD; Model No.: SAPA001) on a construction site with an applicator/vac/recycling equipment. The dry superabsorbent granules come out of a hopper, down a hose, and out of a nozzle and onto the exposed dirt and exposed critical building areas of the construction site. When the rainwater falls, it is immediately absorbed by the superabsorbent granules and never reaches the dirt and the critical areas of building under construction. After the rain stops, the worker reconfigures the applicator/vac/recycling equipment to suck up the wet superabsorbent granules through a vac hood attachment, then through the hose, and then blown back into the hopper. Then, using a moving interior wall of the hopper, the compaction motion squeezes the rainwater out, and/or a heater inside applies warm air to dry the superabsorbent granules so that they are ready for the next storm. The dirt on the construction site remains dry, and the work can proceed like the rain never happened.

Example 2: Method of Making the Application Bag

An upper casing made of a geotextile fabric that is water permeable with dimensions of about 2 feet by 3 feet is provided. A lower casing made of a waterproof, plastic fabric with the same dimensions of 2 feet by 3 feet is provided. The edges of the upper casing are sewn together with the edges of the lower casing to form a casing of about 2 feet by 3 feet. The casing is formed with a reclosable opening that is sealed with a Velcro® hook and loop closure. Next, 36 ounces (i.e., 6 ounces per square foot) of superabsorbent granules of potassium polyacrylate from Shandong Welldone Environmental New Materials Co., Ltd. (No. 230 Changjiang Road, Qingdao City, Shandong Province, China; Brand name: WD; Model No.: SAPA001) are distributed through the reclosable opening into the one large compartment of an application bag.

Example 3: Methods of Absorbing Rainwater to Prevent the Rainwater from Reaching an Area Using the Application Bag Before rain begins, a worker spreads out application bags made in accordance with Example 2 on a construction site such that the lower casing is in contact with the ground and the upper casing faces upward. When the rainwater falls, it is absorbed by the superabsorbent granules in the casing and never reaches the dirt and the critical areas of building under construction or landscaping site. After the rain stops, the worker moves the application bags with the wet superabsorbent granules out of the way of construction to be dried. For drying, the application bags are inverted so that the lower casing is on top and the upper casing is on bottom. The worker inserts a hose into the reclosable opening of the casing to blow hot or cold air inside the casing with a turbine heater or fan until the superabsorbent granules are dry and ready for the next storm. The dirt on the construction site remains dry, and the work can proceed like the rain never happened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of absorbing falling precipitation to prevent the falling precipitation from reaching an area for an activity, comprising:
    providing at least one application bag comprising a casing containing superabsorbent granules, wherein the superabsorbent granules can absorb at least 200 times their weight in water; and
    placing the at least one application bag over an area that is desired to be kept dry prior to or during the falling precipitation but not after the falling precipitation stops;
    wherein the at least one application bag comprises a sufficient amount of superabsorbent granules to absorb the falling precipitation before the falling precipitation can reach the area, and
    wherein the activity can immediately occur after the falling precipitation stops and the at least one application bag is removed.

2. The method of claim 1, wherein the falling precipitation is at least one of rain, snow, sleet, or hail.

3. The method of claim 1, wherein the activity is a construction, landscaping, or sports activity or any activity that needs to be protected from falling precipitation.

4. The method of claim 1, wherein the superabsorbent granules comprise sodium polyacrylate or potassium polyacrylate.

5. The method of claim 1, wherein the casing comprises an upper casing and a lower casing, and wherein the upper casing and the lower casing are made of a water permeable fabric material.

6. The method of claim 1, wherein the casing comprises dividers to form channels inside the application bag.

7. The method of claim 1, further comprising:
    removing the superabsorbent granules from the casing through a reclosable opening in the casing; and
    drying the superabsorbent granules and placing the superabsorbent granules back in the casing for reuse.

8. The method of claim 1, further comprising:
    drying the superabsorbent granules at the site of the area after the one or more application bag is removed so that the one or more application bag can be reused.

9. A method of absorbing falling precipitation to prevent the falling precipitation from reaching an area for an activity, comprising:
    providing at least one application bag comprising a casing containing superabsorbent granules, wherein the superabsorbent granules can absorb at least 200 times their weight in water, and wherein the casing comprises a water-permeable upper casing and a waterproof lower casing;
    placing the at least one application bag over an area that is desired to be kept dry prior to or during the falling precipitation so that the falling precipitation passes through the upper casing but does not pass through the lower casing;
    wherein the at least one application bag comprises a sufficient amount of superabsorbent granules to absorb the falling precipitation to keep the area dry, and
    wherein the activity can immediately occur after the falling precipitation stops and the at least one application bag is removed.

10. The method of claim 9, wherein the upper casing comprises a non-woven fabric or geotextile, and wherein the lower casing comprises a waterproof plastic fabric, plastic sheeting, or a waterproof geotextile.

11. The method of claim 9, wherein the lower casing comprises the same material as the upper casing, and wherein the lower casing is coated with a waterproof coating.

12. The method of claim 9, wherein the lower casing is sewn and/or sealed together with the upper casing.

13. The method of claim 9, wherein the falling precipitation is at least one of rain, snow, sleet, or hail.

14. The method of claim 9, wherein the activity is a construction, landscaping, or sports activity or any activity that needs to be protected from falling precipitation.

15. The method of claim 9, wherein the superabsorbent granules comprise sodium polyacrylate or potassium polyacrylate.

16. The method of claim 9, further comprising drying the at least one application bag at the site of the area after the at least one application bag is removed.

17. The method of claim 9, wherein the application bag is placed on concrete that is not fully cured wherein the lower casing is in contact with the concrete that is not fully cured.

18. A method of absorbing falling precipitation to prevent the falling precipitation from reaching an area for an activity, comprising:
    providing at least one application bag comprising a casing containing superabsorbent granules, wherein the superabsorbent granules can absorb at least 200 times their weight in water;
    placing the at least one application bag over an area that is desired to be kept dry prior to or during the falling precipitation, wherein the at least one application bag comprises a sufficient amount of superabsorbent granules to absorb the falling precipitation before the falling precipitation can reach the area, wherein the activity can immediately occur after the falling precipitation stops and the at least one application bag is removed; and
    drying the at least one application bag at the site of the area so the at least one application bag can be reused.

19. The method of claim 18, wherein the step of drying the at least one application bad on-site comprises one or more of blowing hot or cool air inside the casing, squeezing the casing, and removing the superabsorbent granules from the casing.

20. The method of claim 18 wherein the casing comprises a water-permeable upper casing and a waterproof lower casing, and wherein the step of drying the at least one application bag comprises inverting the application bag so that the lower casing is on top and the upper casing in on bottom.

* * * * *